United States Patent
Samantaray et al.

(10) Patent No.: US 9,092,576 B2
(45) Date of Patent: Jul. 28, 2015

(54) NON-INTRUSIVE MEASUREMENT OF CONTENT QUALITY USING DRY RUNS WITH ROLL-BACK

(75) Inventors: Sarmistha Samantaray, Lexington, MA (US); Sampathkumar Sriramadhesikan, Burlington, MA (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 12/823,277

(22) Filed: Jun. 25, 2010

(65) Prior Publication Data

US 2011/0321012 A1    Dec. 29, 2011

(51) Int. Cl.
G06F 11/30 (2006.01)
G06F 11/36 (2006.01)
G06F 11/00 (2006.01)

(52) U.S. Cl.
CPC ............ *G06F 11/368* (2013.01); *G06F 11/008* (2013.01); *G06F 11/3688* (2013.01)

(58) Field of Classification Search
CPC .................................. G06F 17/30; G06F 17/00
See application file for complete search history.

(56) References Cited

U.S. PATENT DOCUMENTS

| | | | | |
|---|---|---|---|---|
| 3,714,805 | A * | 2/1973 | Stone | 72/10.4 |
| 5,465,328 | A * | 11/1995 | Dievendorff et al. | 714/15 |
| 5,488,871 | A * | 2/1996 | Harbottle et al. | 73/862.55 |
| 6,484,582 | B2 * | 11/2002 | Ehrfeld et al. | 73/593 |
| 6,651,073 | B1 * | 11/2003 | Lyle et al. | 1/1 |
| 6,801,921 | B2 * | 10/2004 | Tsuchida et al. | 1/1 |
| 6,829,623 | B2 * | 12/2004 | Tsuchida et al. | 1/1 |
| 7,065,538 | B2 * | 6/2006 | Aronoff et al. | 1/1 |
| 7,080,371 | B1 * | 7/2006 | Arnaiz et al. | 717/170 |
| 7,249,174 | B2 * | 7/2007 | Srinivasa et al. | 709/223 |
| 7,277,900 | B1 * | 10/2007 | Ganesh et al. | 707/682 |
| 7,281,050 | B2 * | 10/2007 | Dinker et al. | 709/229 |
| 7,373,451 | B2 * | 5/2008 | Lam et al. | 711/6 |
| 7,398,349 | B2 * | 7/2008 | Birrell et al. | 711/103 |
| 7,461,103 | B2 * | 12/2008 | Aronoff et al. | 1/1 |

(Continued)

FOREIGN PATENT DOCUMENTS

CN           101477548           7/2009

OTHER PUBLICATIONS

Peng Liu, Sushil Jajodia, Meng Yu, "Damage Quarantine and Recovery in Data Processing Systems," 2008, SpringerLink—Handbook of Database Security, pp. 383-407.*

(Continued)

*Primary Examiner* — Farhan Syed
(74) *Attorney, Agent, or Firm* — Robert H. Frantz; Jeffrey S. LaBaw

(57) ABSTRACT

Validation and determination of business application program content quality destined for loading on a target production computing environment is automated by receiving an application program into a controlled production computing environment, and, during a dry run test in the production computing environment, logging changes to content from an initial state as loaded by the application program; applying a business rule to the content during data loading to validate against business objects; capturing validation errors produced by the validation and structural change commands to the content into a log file; and automatically rolling back changes made to the content during the dry run test to the initial state thereby avoiding committing content changes to the production computing environment.

9 Claims, 7 Drawing Sheets

(56) References Cited

U.S. PATENT DOCUMENTS

| | | | | |
|---|---|---|---|---|
| 7,509,530 | B2* | 3/2009 | Welts | 714/15 |
| 7,546,286 | B2* | 6/2009 | Dickinson et al. | 1/1 |
| 7,594,138 | B2* | 9/2009 | Abdulvahid | 714/6.1 |
| 7,831,821 | B2* | 11/2010 | Chen et al. | 713/2 |
| 7,890,543 | B2* | 2/2011 | Hunt et al. | 707/803 |
| 7,945,814 | B2* | 5/2011 | Watanabe et al. | 714/19 |
| 7,953,696 | B2* | 5/2011 | Davis et al. | 707/608 |
| 8,032,736 | B2* | 10/2011 | Abrashkevich et al. | 712/228 |
| 8,078,588 | B2* | 12/2011 | Lakshminath et al. | 707/675 |
| 2003/0233431 | A1* | 12/2003 | Reddy et al. | 709/221 |
| 2004/0199572 | A1* | 10/2004 | Hunt et al. | 709/201 |
| 2005/0010454 | A1* | 1/2005 | Falk et al. | 705/4 |
| 2005/0182739 | A1 | 8/2005 | Dasu et al. | |
| 2007/0208787 | A1 | 9/2007 | Cheng et al. | |
| 2008/0195430 | A1 | 8/2008 | Rustagi | |
| 2009/0292947 | A1* | 11/2009 | Ganesh et al. | 714/16 |
| 2010/0005346 | A1 | 1/2010 | Hamlescher et al. | |
| 2010/0011026 | A1* | 1/2010 | Saha et al. | 707/200 |
| 2010/0082962 | A1* | 4/2010 | Srinivasan et al. | 713/2 |
| 2011/0022577 | A1* | 1/2011 | Al-Khatib | 707/705 |
| 2011/0191299 | A1* | 8/2011 | Huynh Huu et al. | 707/646 |
| 2011/0321012 | A1* | 12/2011 | Samantaray et al. | 717/122 |

OTHER PUBLICATIONS

Zimmermann, Thomas, Andreas Zeller, Peter Weissgerber, and Stephan Diehl. "Mining version histories to guide software changes." Software Engineering, IEEE Transactions on 31, No. 6 (2005): 429-445.*

Anonymous Author; "Automation of Data Flow from Acquisition to Interpretation Applications", publisher IP.com, Disclosure No. IPCOM000184154D, dated Jun. 12, 2009, retrieved from http://ip.com/IPCOM/000184154.

John E Bentley; "Software Testing Fundamentals-Concepts, Roles, and Terminology"; Retrieved on Jun. 15, 2010 from http://www2.sas.com/proceedings/sugi30/141-30.pdf.

Whatis.com; "Commit"; Retrieved on Jun. 15, 2010 from http://searchsqlserver.techtarget.com/definition/commit.

IBM Corporation; "Database commits and rollbacks for controller commands"; Retrieved on Jun. 15, 2010 from http://publib.boulder.ibm.com/infocenter/wchelp/v5r6/index.jsp?topic=/com.ibm.commerce.developer.doc/concepts/csdprogrammingguide07.htm.

IBM Corporation; "IBM WebSphere Commerce glossary"; Retrieved on Jun. 15, 2010 from http://publib.boulder.ibm.com/infocenter/wchelp/v5r6/topic/comibm.

IBM Corporation; "Migratrion Manager Guide"; version 7.1, retrieved on Jun. 15, 2010 from http://publib.boulder.ibm.com/infocenter/tivihelp/v3r1/topic/com.ibm.tamit.doc_7.1/pdf/mam71_migration_mgr_guide.pdf.

IBM Corporation;"Fix Pack v.7.1.1 ReadMe"; Retrieved on Jun. 15, 2010 from ftp://public.dhe.ibm.com/software/tivoli_support/patches/patches_7.1.1.6/7.1.1.6-TIV-ITRPM-FP0006/7.1.1.6-TIV-ITRPM-FP0006.README.

Whatis.com; "Rollback"; Retrieved on Jun. 15, 2010 from http://searchsqlserver.techtarget.com/definition/rollback.

SBVR; "Semantics of Business Vocabulary and Business Rules"; Jan. 2008; pp. 8-9 definitions, retrieved from http://www.omg.org/spec/SBVR/1.0/PDF.

Aptest.com; Software Testing Glossary, retrieved on Apr. 8, 2014 from http://www.aptest.com/glossary.htm.

Free Online Dictionary of Computing; definition of "scope", retrieved on Apr. 8, 2014 from http://foldoc.org/scope.

International Software Testing Qualifications Board; "Standard Glossary of Terms Used in Software Testing", version 2.2, Oct. 19, 2012.

Shawlands Academy; "Software Development—Chapter 4 Software Testing and Tools"; retrieved on Apr. 8, 2014 from Shawlands Academy (Glasgow, Scotland) from http://www.shawlandsacademy.glasgow.sch.uk/Websites/SchSecShawlands/UserFiles/File/Computing/Advanced-Higher-Software-Development/Soft-Dev-Chap-04.ppt.

Softwaretestinghelp.com; "Software Testing terms complete glossary", retrieved on Apr. 8, 2014 from http://www.softwaretestinghelp.com/software-testing-terms-complete-glossary/.

Villanova University; "Glossary of Software Testing Terms", retrieved on Apr. 8, 2014 from http://www.csc.villanova.edu/~tway/courses/csc4700/s2004/.

Askville; "Why are there so many environments in software development?", retrieved from http://askville.amazon.com/environments-software-development on Dec. 4, 2014.

Technopedia; "Production Environement", retrieved from http://www.techopedia.com/definition/8989/production-environment on Dec. 4, 2014.

* cited by examiner

NON-INTRUSIVE MEASUREMENT OF CONTENT QUALITY USING DRY RUNS WITH ROLL-BACK

FEDERALLY SPONSORED RESEARCH AND DEVELOPMENT STATEMENT

This invention was not developed in conjunction with any Federally sponsored contract.

CROSS-REFERENCE TO RELATED APPLICATIONS (CLAIMING BENEFIT UNDER 35 U.S.C. 120)

None.

MICROFICHE APPENDIX

Not applicable.

INCORPORATION BY REFERENCE

None.

FIELD OF THE INVENTION

The invention generally relates to systems and computerized methods to test application programs prior to deployment to a production or "live" computing environment.

BACKGROUND OF INVENTION

In the field of Information Technology (IT), packaged business applications are delivered to IT customers with many "out of the box" functionalities and content. The intent of these functionalities and content is to have customers install and use the business applications as quickly as possible. However, not all customer requirements are met by what is delivered "out of the box".

As a result, configuration and customization of the business applications is required to ensure the business applications meet the specific needs of the customer's end users. Configuration and customization activity usually occurs in a development environment resulting in the creation of additional content or modification of the "out of the box" content, that must later be "promoted" (or loaded) in a controlled manner into upper IT environments such as "stage", "test" and finally, "production" environments where the business applications are opened to end users. During this promotion (or data loading) activity, it is important to ensure that the integrity of upper IT environments is preserved at all times and business applications function as they were designed and as the end users expect them to behave.

Often, configuration and customization is done incorrectly, or the content is promoted in an incomplete manner such that upper IT environments are compromised. Many business applications report errors when loading, displaying or executing such incorrect or incomplete content. A number of functions may no longer be performed due to 'bad data'. This leads to higher costs in implementing and maintaining package business application solutions and ensuring end user productivity is not lowered. Thus, the quality of content promoted from development for loading into upper IT environments is critical to the availability and proper functioning of business applications to their end users.

It is generally accepted in the IT environment that the later in the process (or higher in the promotion scheme) that problems are found, the more expensive the correction is to make.

Typical solutions to try to address such problems employ extra product environments into which complete data loading is performed in order to validate integrity of data. This is inefficient because of hardware, software and project overheads in installing, configuring these environments, which at their best, are a complete duplicate of the targeted production systems, thereby causing a doubling of cost and size of the required technology. To save costs, power, and size, many pre-production environments are only partially representative of the final production system, saving cost of the test platforms, but adding risk to the final promotion to production environments.

SUMMARY OF THE INVENTION

The present invention automates the validation and determination of business application program content quality destined for loading on a target controlled production computing environment by receiving an application program into the production computing environment, and, during one or more dry run tests of the application program in the production computing environment, logging changes to content from an initial state as loaded by the application program; applying a business rule to the content during data loading to validate against a business object; capturing validation errors produced by the validation and structural change commands to the content into a log file stored in at least one computer readable memory device; and automatically rolling back changes made to the content during the dry run test to the initial state thereby avoiding committing content changes to the controlled production computing environment, wherein the application program is executed by a computing platform having a processor; and wherein the content is stored in a computer readable memory device.

BRIEF DESCRIPTION OF THE DRAWINGS

The description set forth herein is illustrated by the several drawings.

DETAILED DESCRIPTION OF EMBODIMENT(S) OF THE INVENTION

Figure 1A:
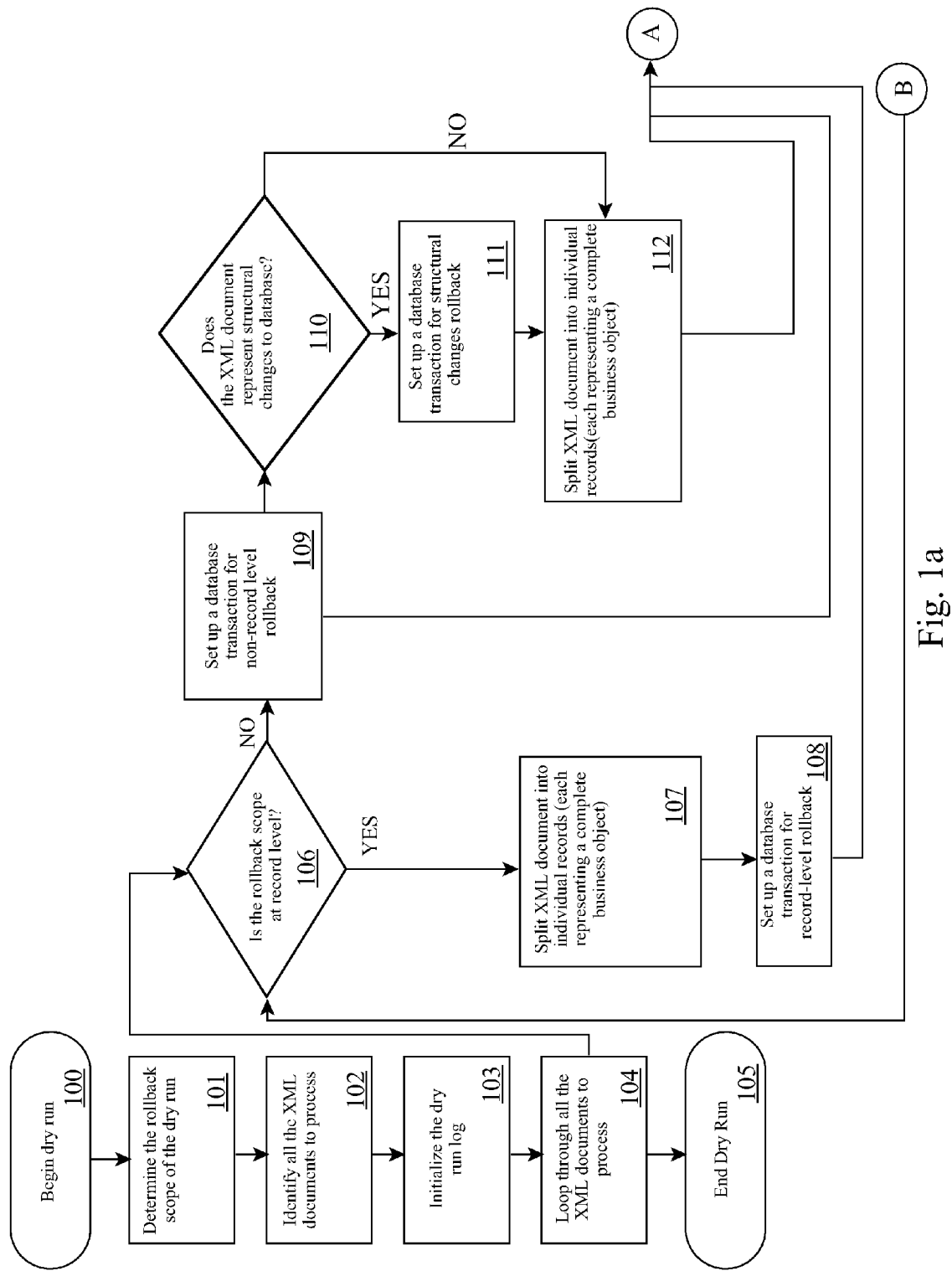
FIGS. 1a, 1b, and 1c illustrate logical processes according to the present invention.

The inventors of the present invention have recognized a problem in the art not previously addressed regarding this trade-off of expense versus effectiveness of pre-production testing as currently done in the art. The inventors have recognized that a proactive yet un-intrusive measurement of data quality of content during loading into an application is needed to allow dry running in a targeted production environment, instead of testing in a pre-production environment, to detect problems prior to promotion of business applications to a live status.

This avoids reliance on testing in pre-production environments which do not fully replicate or duplicate the targeted computing environment, which often leads to promotion to a live environment and late discovery of problems, especially problems related to the differences between the environment where the dry run was conducted and the environment where the live execution is done.

For the purposes of this disclosure, we will use the term "content" to refer collectively to Content Management (CM or CMS) structured as well as unstructured digital information, including, for example, data such as financial data, business records, customer service data, marketing information, image files, video files, web pages, word processor documents, and other types of digital information.

Further, we will refer to "roll back" and "commit" as meaning the undoing of partly completed database changes and the final step in the successful completion of a previously started database change, respectively.

Also for the purpose of this disclosure, we will refer to a "dry run" test as a test performed by executing an application program in a controlled production environment in which live or real customers may or may not be present. A dry run in customary practice is executed in a pre-production computing environment, such as a development environment, staging environment or a test environment, where there are no actual customers using the system. While the present invention may also be used in such a pre-production environment, the non-intrusive nature of the invention through the roll-back mechanism allows it to be utilized in a production environment, which is unique in the art.

The following example embodiments will be disclosed with reference to use with and incorporation of the invention with Tivoli™ Migration Manager by International Business Machines Corporation™. Readers who are not familiar with this widely-used product may wish to refer to "Migration Manager Guide" for version 7.1, published by Tivoli division of International Business Machines Corporation (2008), for general information. It will be readily understood by those skilled in the art that the present invention may be useful and applicable to a wide array of similar products such as SAP's™ R/3 Change and Transport System, and BMC's Remedy Migrator™.

The present invention provides a unique system and method of proactively measuring the data quality of content in a non-intrusive manner in the context of content loading in the targeted production environment. One benefit according to the invention is preservation of the integrity of the business applications in content promotion and content sharing scenarios by separating valid content from invalid content. After dry run tests ("dry runs") are completed, the computing are cleaned up as well, so as to provide no lasting changes to the data loaded during the dry runs.

Overview

Content quality is measured in the form of a dry run of the data loading activity. The dry run itself is performed against any combination of content delivered in one or more documents. The dry run enforces multiple business rule validations against a single business object or a set of related business objects. Any validation errors are captured and logged without actually committing the content into the target database. And, preferably, the number of validations applied are narrowed or broadened as desired to determine data integrity.

As such, there are a number of unique aspects and advantages to various embodiments according to the present invention, including but not limited to:

a. data loading/data import failures and recovery can be remediated using dry run methodology;

b. dry run methodology is non-intrusive in that it does not require system shutdown, re-start or logging end users out;

c. each dry run leaves the target database intact, whereas there is no material or structural change to the database that impact business application functionality or current configuration;

d. each dry run captures the quality of the data by triggering business rule validations against that data;

e. each dry run captures the quality of the data in a detailed log that helps administrators determine if the data can be safely imported or requires data correction, scrubbing or re-creation to meet business rules and validations;

f. each dry run can be configured to capture different sets of validations based on scopes;

g. every dry run can be executed as many times as needed, while optionally setting a different scope for each execution to capture the most appropriate validations;

h. using rollback scope, the dry run validations measure quality of all records that comprise business objects;

i. also using rollback scope, the dry run validations measure quality of a set of records of a business object that depends upon a set of records of another business object of the same type; and j. further using rollback scope, the dry run validations measure quality of a set of records of a business object that depends upon a set of records of another business object of a different type.

Using Business Objects to Manage Content

Business applications content is typically stored in a repository such as relational database or an XML-based repository. Such content spans more than one table of the relational database or XML-based repository. Content spanning multiple tables or entities have relationships that tie a set of data together in a manner that is required by the business application that executes business logic based on the data stored in those tables. The term business object is commonly used to describe such entities.

Figure 3:
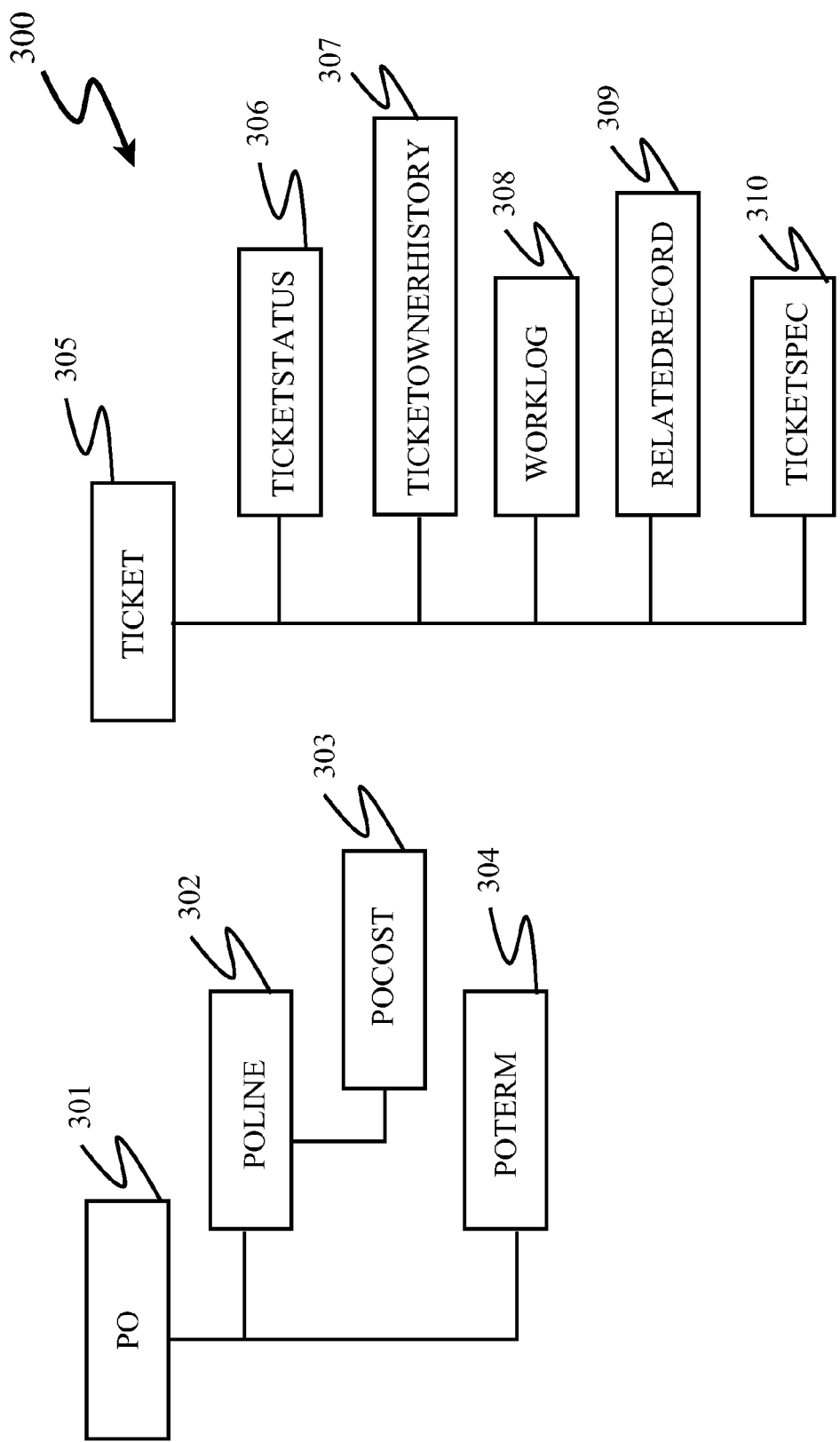
FIG. 3 shows two business objects whose data content reside across multiple tables.

FIG. 3 shows two business objects (300) whose data content reside across multiple tables. The left hand illustration displays a Purchase Order business object whose data content is managed in four different tables: PO (301), POLINE (302), POCOST (303) and POTERM (304) tables. The right hand illustration displays a Ticket business object whose data content is managed in six different tables: TICKET (305), TICKETSTATUS (306), TICKETOWNERHISTORY (307), WORKLOG (308), RELATEDRECORD (309), and TICKETSPEC (310) tables. Each of these tables represent inter-relationships of data physically stored in computer-readable memory devices, such as Random Access Memory (RAM), Read-Only Memory (ROM), disk drives of various sorts such as Hard Disk Drives (HDD) and optical disks, or other, non-transient physical data storage means such as magnetic tape. As such, the storing of the data tables into such computer-readable memory devices necessary physically transforms the devices, whether electronically, optically, magnetically, or a combination of electronic, optical, and magnetic property changes.

During content loading by a business application under going a dry run test, it is necessary to ensure data for the complete business object is loaded.

Using Business Rules to Validate Content

Business applications use business rules to ensure that the required content is present in the tables that comprise the business objects needed to complete or perform the functionalities of the business application. Business rules are enforced through validations and when such content is missing or is incorrect, validations fail causing the functionality delivered by the business application to be broken.

Loading such content into upper IT environments such as into a production environment can drive up IT costs due to non-availability of business applications and, consequently, lower user productivity.

The following table illustrates example business rules enforced for the exemplary Purchase Order and the Ticket business objects shown in FIG. 3. If content in the tables shown in FIG. 3 cannot be validated with the business rules enumerated below, the content is unusable to perform business tasks

TABLE

Example Business Rules for Validation of Content

| Table | Business Rule |
| --- | --- |
| POLINE | If the Purchase Order line has a contract number associated with it, items cannot be added that are not found on the original contract. |
| POLINE | The total order quantity cannot be less than the received quantity. |
| POCOST | If the General Ledger account is to validated against Chart of Accounts, determine if all segments of the account are filled in and the account is active. |
| TICKET | Failure code specified for the ticket should exist in the FAILURECODE table. |
| TICKET | Ticket template specified for the ticket should exist in the TKTEMPLATE table |
| TICKET | The affected user for which ticket is being entered should not have been inactive |
| TICKET | A ticket cannot be related to itself |

During content loading, data validation is preferably executed against the data to ensure data integrity.

Business Objects are Dependent on Other Business Objects

Most business applications are related in some way. A business application may apply validation rules that essentially verify data from another business application. In the Purchase Orders business application example of FIG. 3, POLINE table content will be validated against the CONTRACTNUMBER and other data of the Contracts business application.

Figure 4:
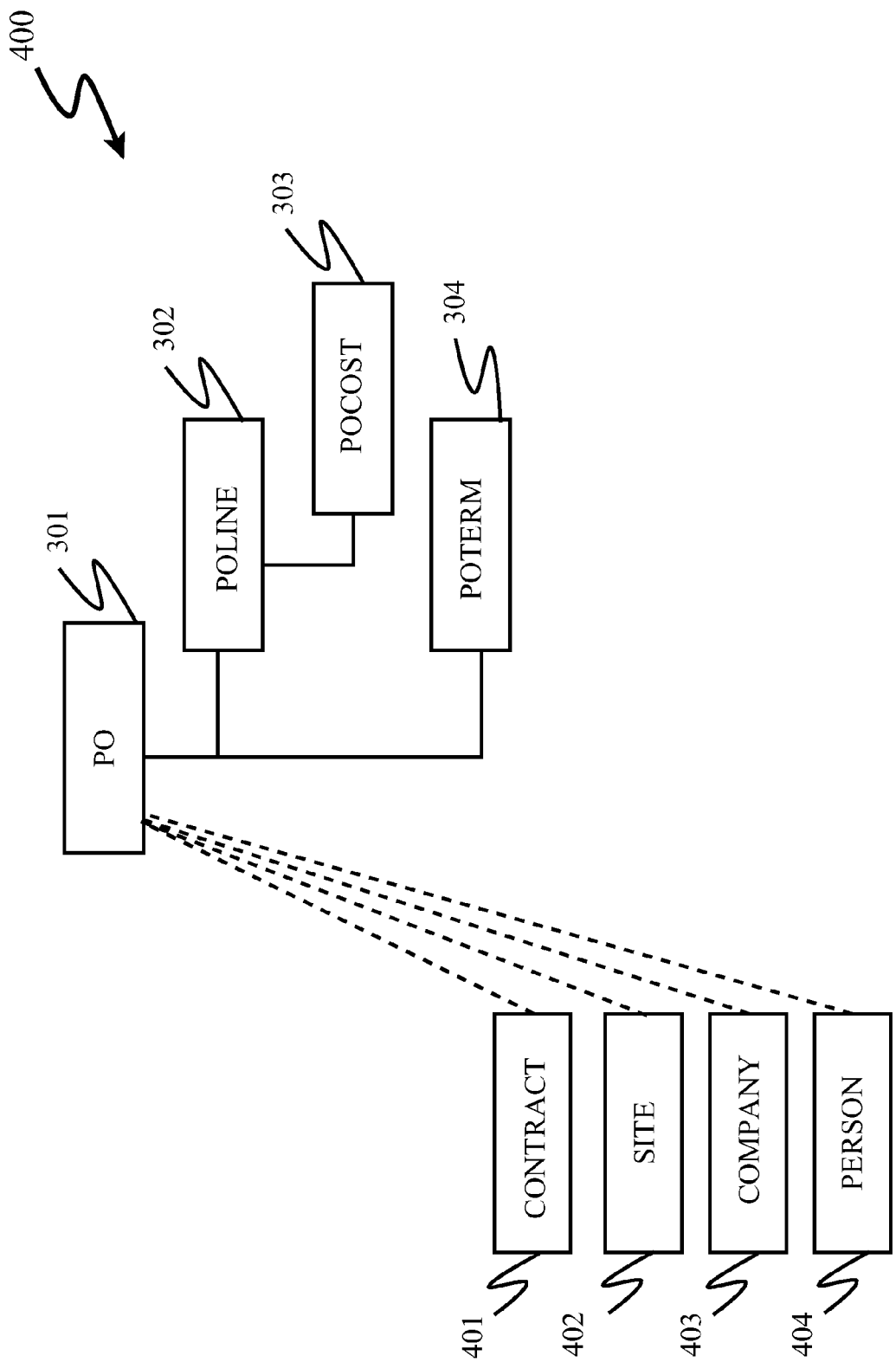
FIG. 4 shows the Purchase Order business object dependency upon other business objects.

FIG. 4 shows (400) dependencies between the Purchase Order (301) business object and the Contract (401), Site (402), Company (403) and Person (404) business objects, for example.

During content loading, data validation preferably extends not just to the current business object, but also to the related business objects. For example, a vendor specified on a Purchase Order must exist in the Company (403) table.

With these examples in mind for use in illustrating the operation of the present invention, we now turn to more details of the logical processes according to the invention. Logical processes such as these may be embodied in a combination of software, hardware, and circuitry, as is commonly done in the art. For example, some parts of the logical processes may be realized by modules of software programs executed by suitable microprocessor and computing hardware, while other parts of the logical processes may be realized into custom integrated circuits or programmable logical devices.

Content quality can be measured in the form of a dry run use of the data loading activity. The dry run itself can be performed against any combination of content delivered in one or more documents. The dry run can enforce multiple business rule validations against a single business object or a set of related business objects. Any validation errors can be captured and logged without actually committing the content into the target database. Most importantly, the number of validations applied can be narrowed or broadened as desired to determine data integrity.

Capturing Data Validations in Non-Intrusive Manner

Data validations have scope:
Validations local to the record being loaded;
Validations for business object;
Validations where one business object depends upon another object of the same type; and
Validations where one business object depends upon another object of different type.

In order to adequately capture different validations, the data is loaded into the target tables comprising the business objects and held there temporarily until the validations fire. Once the appropriate set of validations have fired and the results have been captured, the data is rolled back from the target tables utilizing a database transaction. To accomplish the roll back of the data, two methods can be used: (1) capturing the unmodified data into duplicate tables before the dry run starts and using that data to replace the modified data after the dry run completes, and (2) making a log of each modification to the data and modification to the structure of the tables during the dry run and reversing the actions recorded in the log to restore the data and structures back to their pre-dryrun conditions. Consequently the database transaction demarcates the scope of the validation as well as the rollback.

Figure 5:
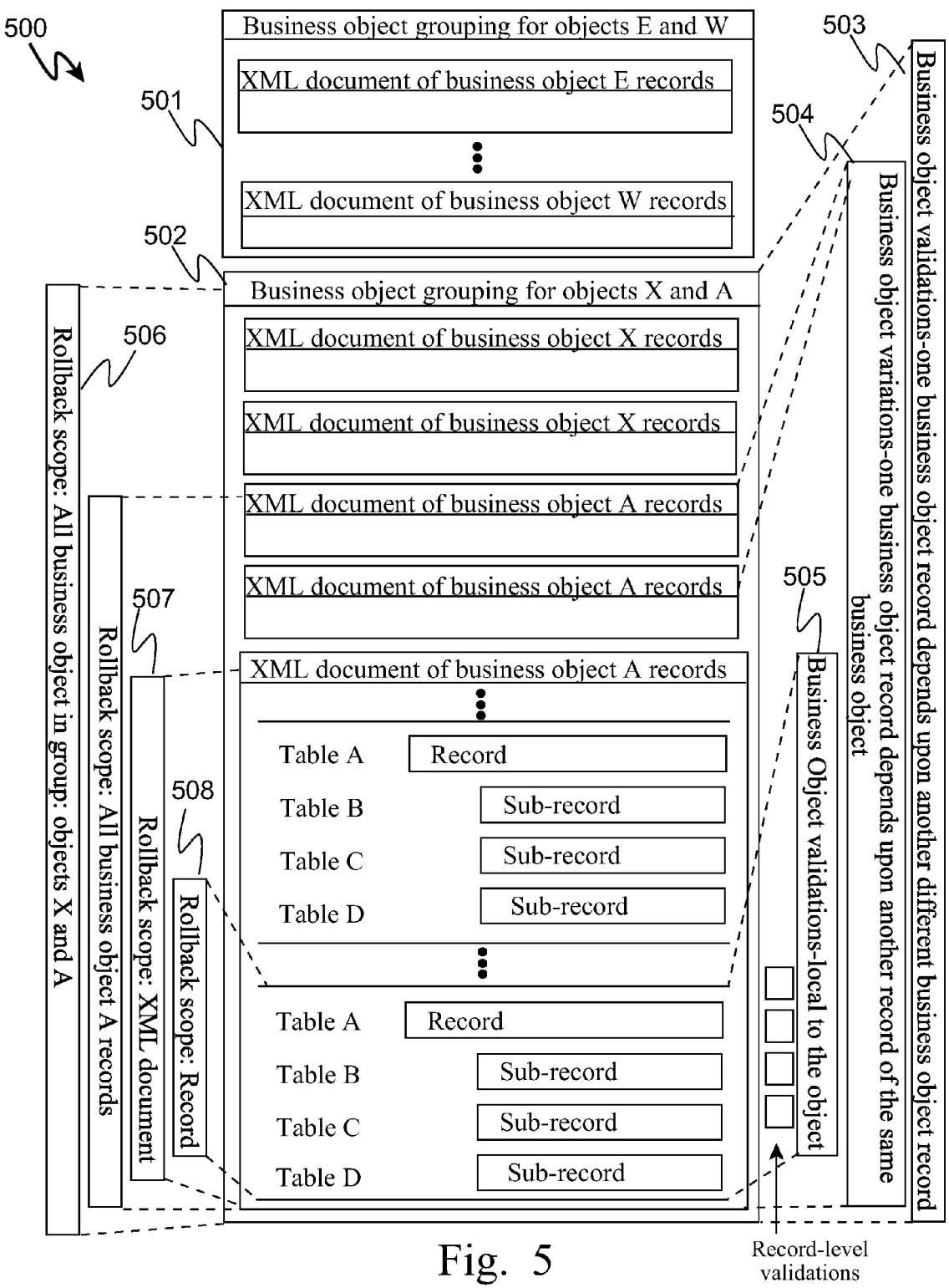
FIG. 5 illustrates validation of data and rollback to the data's pre-dry-run condition, including restoring table structural changes that may occur during a dry run test.

FIG. 5 illustrates rollback which is configurable for each dry run and its correspondence to the sets of validations that are performed against the data. The rollback ensures the database is not materially altered as a result of the dry run. At the same time, a configurable rollback per dry run ensures that the most appropriate set of validations can be triggered against the content being loaded to measure the integrity of data. The loaded data (500) may be grouped by business object, such as a group (501) of records pertaining to business objects E and W and a second group (502) pertaining to business objects X and A. As previously herein, inter-object dependencies (503, 504, 505) may be accommodate and validated. The Rollback scope may correspond to a logical group (506), such as all objects related to records for X and A. Rollback may also be performed to a per-document scope (507), or on a per-record scope (508).

A target database may be structurally changed as a result of content loading. A new column may be added to an existing table, for example, or a new table may be added with foreign keys to an existing table. The dry run captures the effect of such structural changes, preferably in the form of SQL-based Data Definition Language (DDL) commands, that would be executed to achieve such structural changes. The DDL commands are constructed but not executed. Instead, the commands are captured in the dry run log. This provides the ability for database administrators to verify the suitability of the commands and their effect on the target database. This capability is also useful in maintaining the integrity of the business applications.

Logical Processes in Detail

Figure 1B:
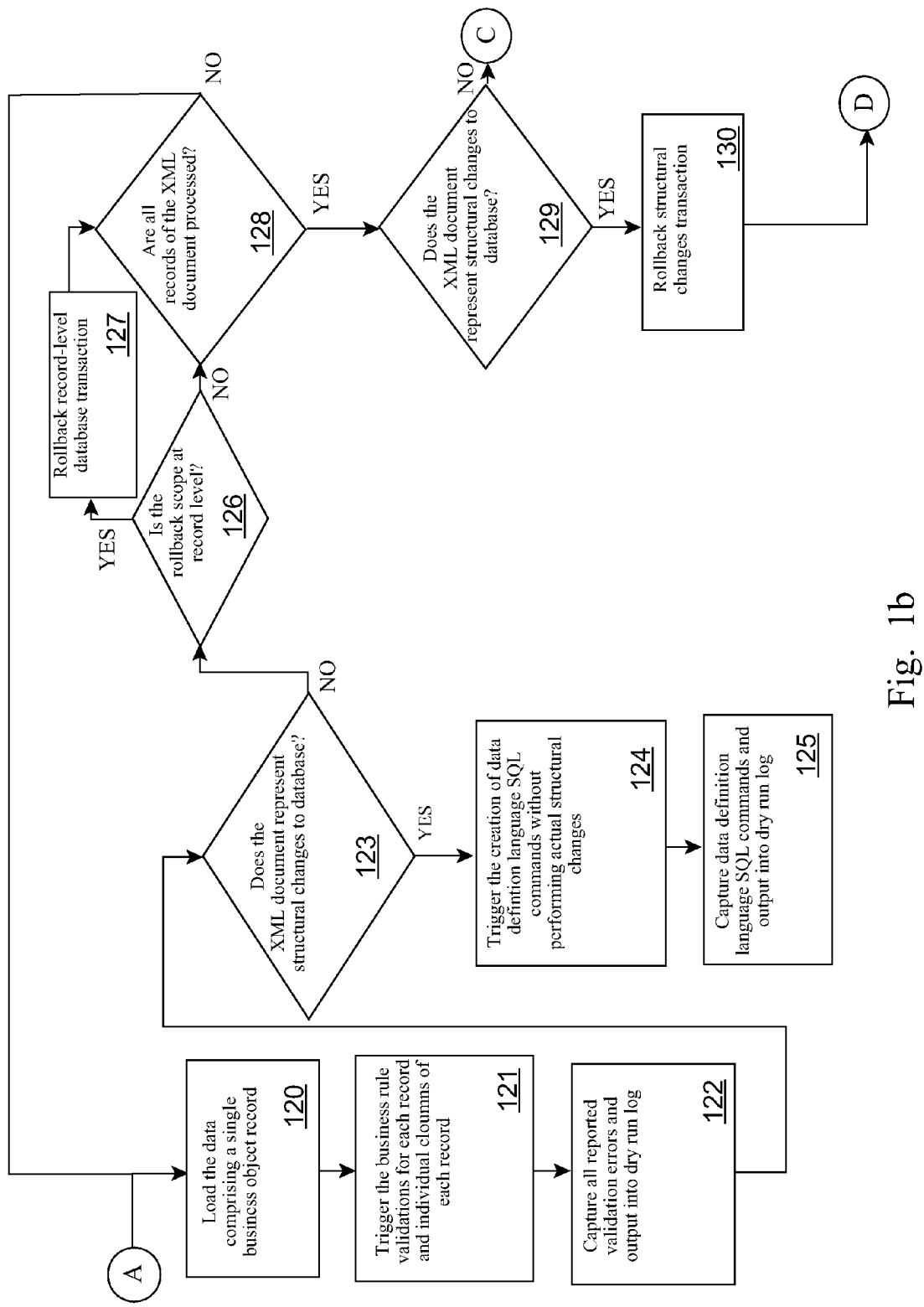
Figure 1C:
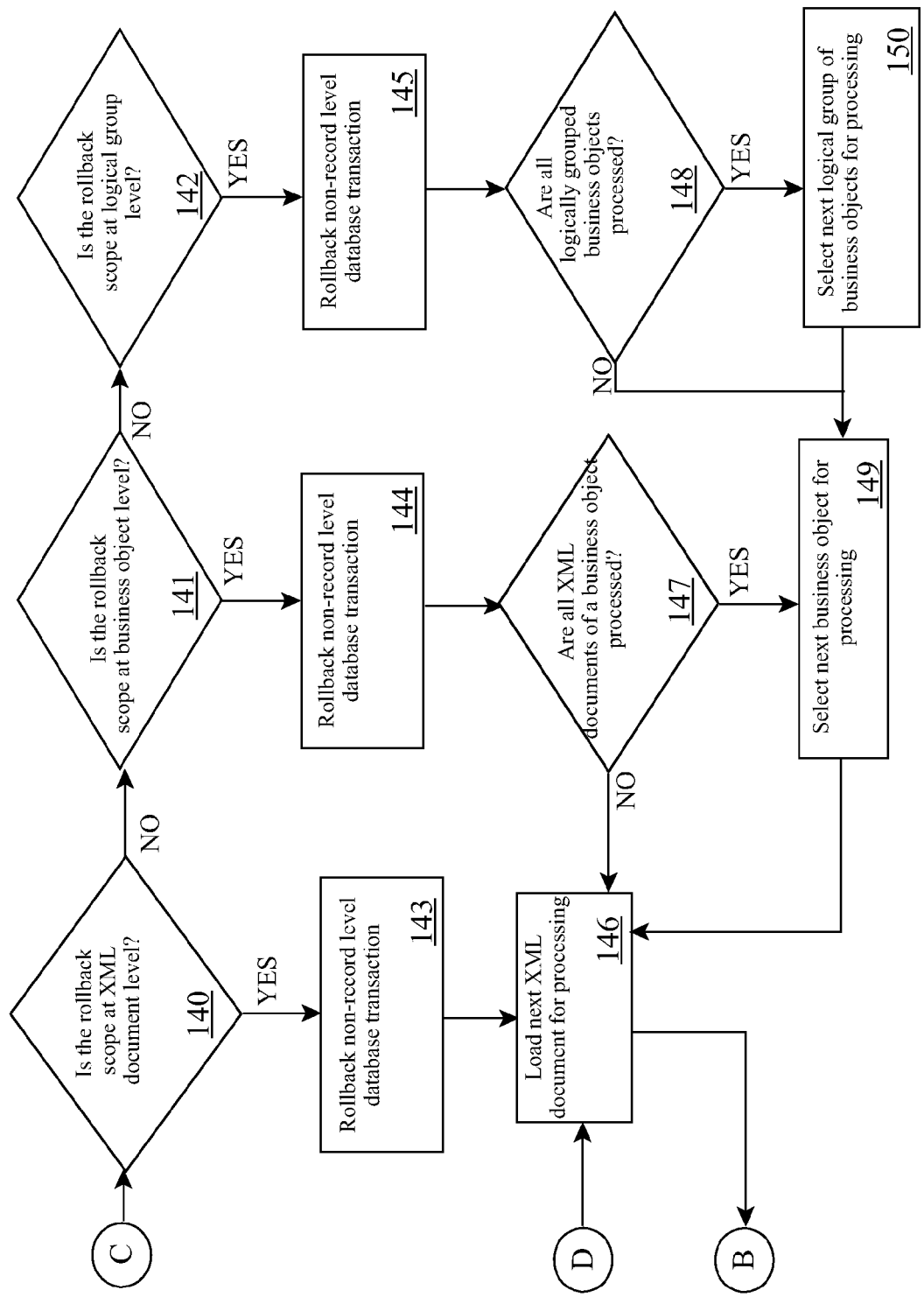

FIGS. 1*a*, 1*b*, and 1*c* illustrate logical processes according to the present invention, which may be realized in programming languages suitable for business applications and executed by a suitable computer, in circuitry, or a combination of programming, computer, and circuitry. Extensible Markup Language (XML) documents and Structured Query Language (SQL) are referred to in the present figures for illustration purposes, whereas other types of documents and data structures stored in computer-readable memory devices may also be processed using other query languages, as well.

In FIG. 1a, the process begins (100) by determining the scope of the rollback (101) for the dry run, and identifying (102) the documents to be processed. The dry run log is then initialized (103) accordingly, noting the scope of the rollback and the documents, tables and databases affected by the dry run.

Then, each document to be processed is considered, such as in a looping manner (104), in which some documents may be split into records (107) and record-level rollback is selected (108). Otherwise (106), database transactions are not tracked or logged at the record-level (109). Also, if the document being processed represents structural changes to the data (110), such as adding a column to a table or appending two tables, then structural change commands are set to be logged (111), and then the document is split (112) into records according to the business objects which the represent.

Turning to FIG. 1b, the logical process continues (A) by loading (120) the data representing a business object, the business rule is triggered to validate it (121), and any errors are captured (122) to the log. If structural changes are being made (123), then the structural change commands are created (124) and captured (125) into the log, but they are not executed. Then, if (126) record-level rollback is being implemented, the affected record is rolled back (127), and the next document, if there are others, is processed (128, 120-127).

When all documents have been processed (128), if structural changes have been logged (129), then those changes are rolled back (130).

Now referring to FIG. 1c, the logical process then rolls back database transactions (143, 144, 145) for any document level (140), business object level (141) and logical group level (142) changes which were logged.

Then, the document loop continues to the next business object (147, 149) in the document, if there is another, logical group (148, 150), if there is another, and eventually to the next document (146), if there is another, else the dry run is complete (105).

Results of Implementation and Prototyping

A process according to the invention was implemented and prototyped. During testing of the prototype embodiment, several aspects of the invention were observed, and the process was updated to reflect these realities with customer environments:

Structural changes to content loaded by the application: Not all the dry run testing is simply database record insertions or updates. Dry run testing must also capture the effect of structural changes on the underlying database, such as specific SQL DDL commands which would have been executed against the underlying database. A DBA is able to interpret the effect of these SQL DDL commands. Such commands create, modify, or remove database entities such as tables, views, indexes, etc as against simple records in a table. As such, processes according to the invention provide a mechanism to capture these commands without actually applying them to the database.

Transaction

Scopes: The relationship among data cannot usually be predicted in advance of executing an application program. Therefore, it is useful to hold the data temporarily in the tables either for a longer or shorter duration depending upon how deep the relationships among data are. The scopes setting or limitation of the dry run testing addresses this practical requirement by providing a 'rubberbanding' around the dry run.

Capturing the effect of deletes: The dry run test can also capture the effect of deletion of records from tables. Any validations that run during business data deletion can then be triggered and the results logged. But the actual physical record is not be really deleted in such a scenario during dry run testing.

Computer Program Product

As will be appreciated by one skilled in the art, aspects of the present invention may be embodied as a system, method or computer program product. Accordingly, aspects of the present invention may take the form of an entirely hardware embodiment, potentially employing customized integrated circuits, or an embodiment combining software (software, modules, instances, firmware, resident software, micro-code, etc.) with suitable logical process executing hardware (microprocessor, programmable logic devices, etc.).

Furthermore, aspects of the present invention may take the form of a computer program product embodied in one or more computer readable memories having computer readable program code embodied or encoded thereon or therein.

Any combination of one or more computer readable memories may be utilized, such as Random Access Memory (RAM), Read-Only Memory (ROM), hard disk, optical disk, removable memory, and floppy disks. In the context of this document, a computer readable storage memory may be any tangible medium that can contain, or store a program for use by or in connection with an instruction execution system, apparatus, or device.

Computer program code for carrying out operations for aspects of the present invention may be written in any combination of one or more programming languages, including, but not limited to, an object oriented programming language such as Java™, Smalltalk™, C++™ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions executed by a microprocessor, or alternatively, as a part or entirety of a customized integrated circuit. These computer program instructions may be provided to a processor of a or other programmable data processing apparatus to produce a machine, such that the instructions, which execute via the processor of the computer or other programmable data processing apparatus, create a tangible means for implementing the functions/acts specified in the flowchart and/or block diagram block or blocks.

These computer program instructions may also be stored in a computer readable memory that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The several figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and flowchart illustration, can be implemented by special purpose hardware-based systems that perform the specified functions or acts, or combinations of special purpose hardware and computer instructions.

Suitable Computing Platform

Figure 2:
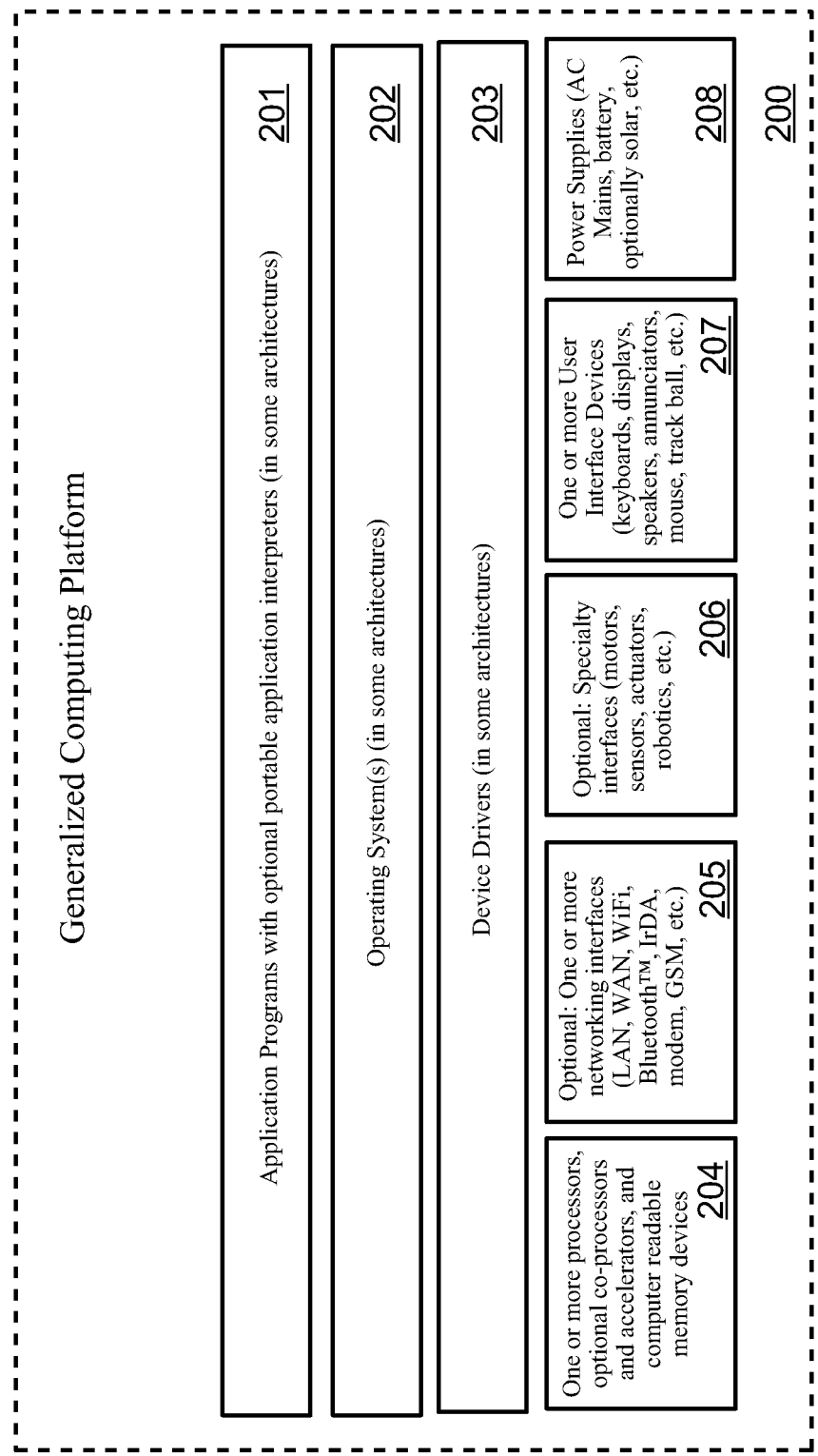
FIG. 2 depicts a generalization of a wide range of computing platforms.

Regarding computers for executing the logical processes set forth herein, it will be readily recognized by those skilled in the art that a variety of computers are suitable and will become suitable as memory, processing, and communications capacities of computers and portable devices increases. FIG. 2 illustrates a generalized computing platform (200), such as common and well-known computing platforms such as "Personal Computers", web servers such as an IBM iSeries server, and portable devices such as personal digital assistants and smart phones, running a popular operating systems (202) such as Microsoft™ Windows™ or IBM™ AIX™, Palm OS™, Microsoft Windows Mobile™, UNIX, LINUX, Google Android™, Apple iPhone™ operating system, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (201) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The hardware portion of a computing platform typically includes one or more processors (204) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (205) may be provided, as well as specialty interfaces (206) for specific applications. If the computing platform is intended to interact with human users, it is provided with one or more user interface devices (207), such as display(s), keyboards, pointing devices, speakers, etc. And, each computing platform requires one or more power supplies (battery, AC mains, solar, etc.) (208). Some of these hardware portions may be interfaced to the operating system (202) through one or more device drivers (203) in some architectures.

Conclusion

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. An computer-implemented method for validating and determining data and content quality of a business application to be loaded in a target production computing environment comprising:

during a dry run test of a first instance of an application program in a production computing environment in which end-users are actively using one or more additional instances of the application program also in the production computing environment:

logging changes made directly to application content in the production computing environment from an initial state as loaded by the first instance of the application program;

applying a business rule to the application content in the production computing environment during data loading to validate against a business object;

capturing validation errors produced by the validation and structural change commands to the application content in the production computing environment into a log file stored in at least one computer readable memory device, wherein the capturing comprises capturing a scope of data validation selected from the group consisting of a scope of validation which is local to a record being loaded, a scope of validation in which a business object depends upon another business object of a same type, and a scope of validations where one business object depends upon another business object of different type; and automatically rolling back changes made to the application content in the production computing environment during the dry run test to the initial state according to the captured scope of data validation, thereby avoiding committing content changes to the production computing environment;

wherein the application program is executed by a computing platform having a processor, and wherein the application content in the production computing environment is stored in a non-transitory computer readable memory device.

2. The automated method as set forth in claim 1 wherein the structural changes are recorded into a log using Data Definition Language (DDL) while preventing the implementation of the structural changes indicated by the logged commands.

3. The automated method as set forth in claim 1 wherein the application content in the production computing environment comprises an Extensible Markup Language document.

4. A computer program product for validating and determining data and content quality of a business application to be loaded in a target production computing environment, the computer program product comprising:

a computer readable non-transitory storage memory device;

program code stored by the computer readable storage memory device to cause a processor to:

during a dry run test of a first instance of an application program in production computing environment in which end-users are actively using one or more additional instances of the application program also in the production computing environment:

log changes made directly to application content in the production computing environment from an initial state as loaded by the first instance of the application program;

apply a business rule to the application content in the production computing environment during data loading to validate against a business object;

capture validation errors produced by the validation and structural change commands to the application content in the production computing environment into a log file stored in at least one computer readable memory device wherein the capturing comprises capturing a scope of data validation selected from the group consisting of a scope of validation which is local to a record being loaded, a scope of validation in which a business object depends upon another business object of a same type, and a scope of validation where one business object depends upon another business object of different type; and automatically roll back changes made to the application content in the production computing environment during the dry run test to the initial state according to the captured scope of data validation thereby avoiding committing content changes to the production computing environment;

wherein the application content in the production computing environment is stored in a non-transitory computer readable memory device.

5. The computer program product as set forth in claim 4 wherein the structural changes are recorded into a log using Data Definition Language (DDL) while preventing the implementation of the structural changes indicated by the logged commands.

6. The computer program product as set forth in claim 4 wherein the application content in the production computing environment content comprises an Extensible Markup Language document.

7. A system for validating and determining data and content quality of a business application to be loaded in a target controlled production computing environment, comprising:

a computing system having a processor configured to execute a logical process;

a computer readable non-transitory storage memory device;

program code stored by the computer readable storage memory device to cause a processor to:

during a dry run test of a first instance of an application program in a production computing environment in which end-users are actively using one or more additional instances of the application program also in the production computing environment:

log changes made directly to application content in the production computing environment from an initial state as loaded by the first instance of the application program;

apply a business rule to the application content in the production computing environment during data loading to validate against a business object;

capture validation errors produced by the validation and structural change commands to the application content in the production computing environment into a log file stored in at least one computer readable memory device wherein the capturing comprises capturing a scope of data validation selected from the group consisting of a scope of validation which is local to a record being loaded, a scope of validation in which a business object depends upon another business object of a same type, and a scope of validation where one business object depends upon another business object of different type; and automatically roll back changes made to the application content in the production computing environment during the dry run test to the initial state according to the captured scope of data validation thereby avoiding committing content changes to the production computing environment;

wherein the application content in the production computing environment is stored in a non-transitory computer readable memory device.

8. The system as set forth in claim 7 wherein the structural changes are recorded into a log using Data Definition Language (DDL) while preventing the implementation of the structural changes indicated by the logged commands.

9. The system as set forth in claim 7 wherein the application content in the production computing environment comprises an Extensible Markup Language document.

* * * * *